United States Patent Office 2,951,977
Patented Sept. 6, 1960

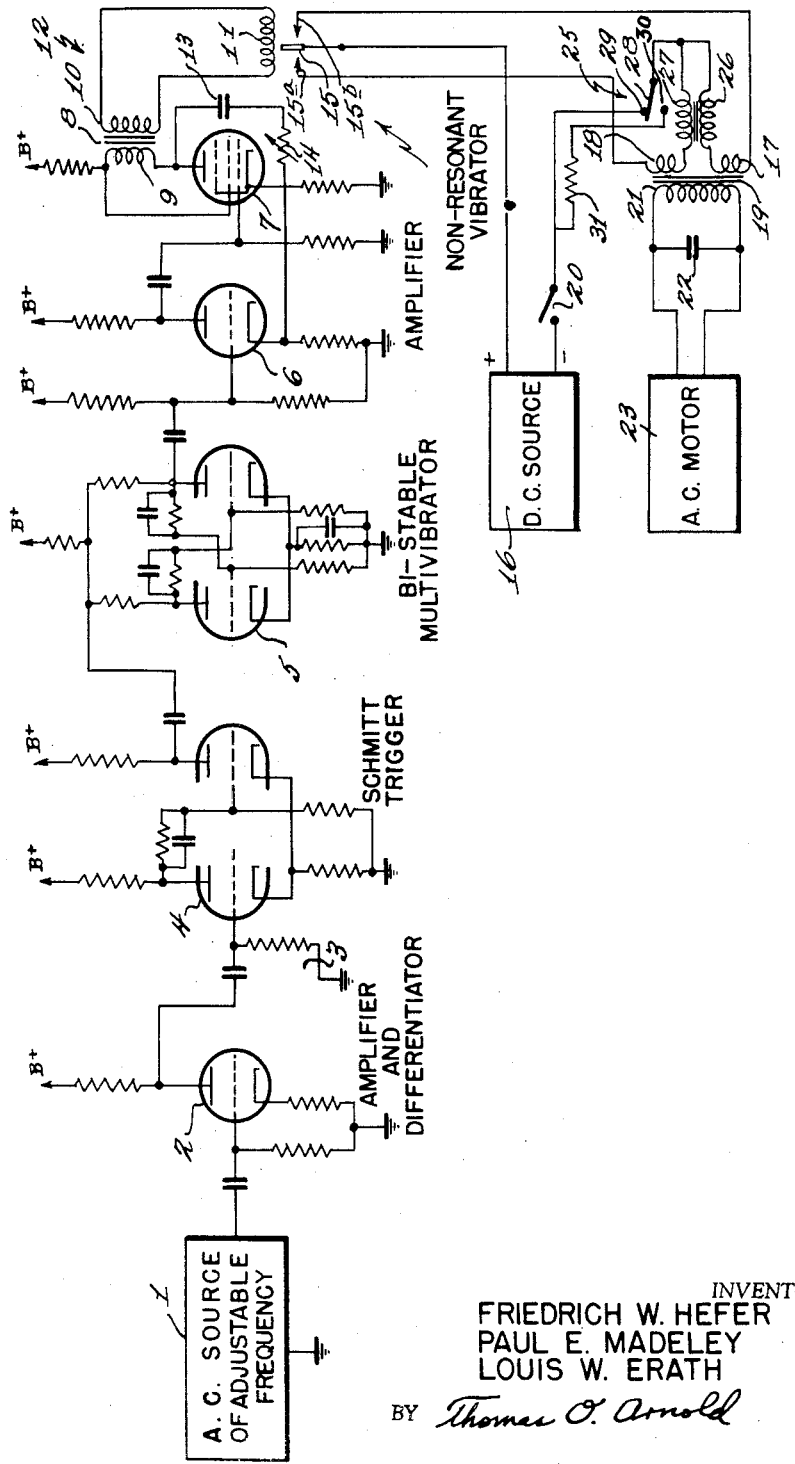

2,951,977

DIRECT CURRENT-ALTERNATING CURRENT CONVERTOR

Friedrich W. Hefer, Paul E. Madeley, and Louis W. Erath, Harris County, Tex., assignors, by mesne assignments, to Dresser Industries, Inc., Dallas, Tex., a corporation of Delaware Filed Aug. 9, 1956, Ser. No. 602,991

5 Claims. (Cl. 321—49)

This application relates to apparatus for converting direct current power to alternating current power, and, more particularly, to apparatus for supplying a cyclic signal with equal dwell time on opposite sides of the signal axis to a D.-C./A.-C. convertor which requires such a signal for satisfactory operation.

The apparatus of the invention is particularly designed to supply a very stable frequency alternating current voltage, which may be used to drive a synchronous motor, for instance.

In recording geophysical exploration results, such as the outputs of geophones, against a time base, it is very important that the record speed be very stable and precisely controlled. Normally, the record is driven by a synchronous motor, and the A.-C. voltage supplied the motor must be maintained of very stable frequency in order that the drive speed will be stable. The usual power mains source is not satisfactory for such operation, because its frequency is not stable enough. Moreover, geophone records are usually made in the field when the only source of voltage available is battery voltage from the truck which carries the recording instrument. The apparatus of this invention is particularly designed to convert voltage from such a D.-C. source into an alternating current voltage of proper frequency stability to drive the synchronous motor of the recorder, though it may be used for any purpose which requires an equal dwell time cyclic voltage.

The apparatus of the invention, generally speaking, includes a D.-C. to A.-C. convertor which requires a cyclic signal of equal dwell time on opposite sides of a datum line, a source of A.-C. voltage (which may be of adjustable frequency to vary the motor speed), a binary counter driven by the A.-C. source, a source of D.-C. voltage connected to the convertor, and means supplying the output of the counter to the convertor to control it. As indicated above, the equal dwell time voltage derived from the binary counter is preferably used to drive a convertor which supplies A.-C. voltage to a synchronous motor. Moreover, the convertor is preferably a non-resonant vibrator. Further, means are supplied in the convertor circuit to detect unequal dwell time of the vibrator, and such means may be used to decrease current through the vibrator contacts and stop the motor until the fault which causes the unequal dwell time condition is corrected.

The apparatus of the invention will now be more particularly described in conjunction with a drawing showing a preferred embodiment thereof.

In the drawing, the single figure is a schematic diagram showing the preferred embodiment of the invention.

The apparatus of the invention includes an A.-C. source of voltage of adjustable frequency 1, which may be, for instance, a tuning fork-controlled oscillator, and which supplies a voltage to an amplifier 2 whose output is developed across a differentiator circuit 3. The differentiated A.-C. voltage drives a Schmitt trigger circuit 4 which is of conventional design. The trigger pulses from the Schmitt trigger circuit are supplied to a bi-stable multivibrator 5, which also is of conventional design. Only the negative trigger pulses from the Schmitt circuit are effective to trigger the multivibrator from one of its stable states to the other, so that the output voltage from the multivibrator is of half the frequency of the source 1. Thereby, it is assured that the dwell time of the output of the multivibrator is equal; that is, the total time positive for the output voltage in each cycle is equal to the total time negative.

The output of the multivibrator is supplied to an amplifier triode circuit 6 and from there to a pentode power stage 7. A transformer 8 has its primary 9 in the plate circuit of the pentode, and the secondary 10 of the transformer is connected across a driving coil 11 of a non-resonant vibrator 12.

In order to improve the stability of the circuit, a feedback from the plate of the pentode to the cathode of the triode, through a circuit including capacitor 13 and adjustable resistor 14 is provided.

The vibrator 12, as is conventional, includes a movable contact 15 which cooperates with fixed contacts 15a and 15b. When the voltage across coil 11 is of one polarity, the movable contact engages fixed contact 15a, while, when the voltage across the coil is of the opposite polarity, the movable contact engages fixed contact 15b. The movable contact 15 is connected to one side of a D.-C. source 16, while the fixed contacts are connected to the electrically remote ends of a pair of primary coils 17 and 18 of a transformer 19. The electrically adjacent ends of coils 17 and 18 are connected through the usual on-off switch 20 to the other side of the D.-C. source 16.

The secondary 21 of transformer 19 is shunted by a capacitor 22 and supplies driving voltage to an A.-C. motor 23. The A.-C. motor may be of the synchronous type especially designed for driving a record on which geophone signals are to be recorded.

The non-resonant vibrator 12 and the D.-C. source 16, when driven by an equal dwell time signal supplied to the vibrator coil, supply balanced currents to the two primaries 17 and 18 of the transformer 19, even if the A.-C. source 1 supplies a voltage which is not of equal dwell time. However, if any defect should occur in the apparatus so far described, and the primary coils are supplied with unbalanced currents, excessive sparking and short contact life for the vibrator would result. To prevent this, the apparatus is provided with a relay 25 which is sensitive to unequal dwell time of the non-resonant vibrator 12. Relay 25 is of the balanced type having a pair of opposed coils 26 and 27 which are connected in series with the electrically adjacent ends of transformer primary coils 17 and 18, respectively, the other sides of the coils being connected together and through the normally closed swinger 28 and contact 29 of the relay to the on-off switch 20. If the movable contact 15 of the vibrator operates to produce an A.-C. signal of unequal dwell time, that is, if the vibrator contact 15 is in engagement with one of contacts 15a and 15b for a longer duration in each cycle than with the other contact, one of the coils 26 and 27 will have a greater voltage developed across it than the other, so that the relay will operate to move swinger 28 into engagement with normally open contact 30 which is connected through a low resistance holding resistor 31 to switch 20. The circuit including resistor 31 provides sufficient relay current to keep the relay operated but reduces the current through the vibrator contacts to prevent contact damage. This reduced vibrator current is not sufficient to provide motor 23 with running voltage, so the motor stops. The operator, noticing that the motor has stopped, can then remedy the defect in the apparatus, reset the relay, and provide proper operation once more.

If it is desired to change the drive speed of motor 23, this may readily be done by changing the frequency supplied from A.-C. source 1 through any conventional method.

It will be evident that many minor changes could be made in the apparatus above described without departing from the scope of the invention. For instance, though a non-resonant vibrator is preferred, some other convertor which requires an equal dwell time signal could be used, and the output of the convertor could be used for a purpose other than driving a synchronous recorder motor. Consequently, the invention is not to be considered limited to the embodiment described, but rather only by the scope of the appended claims.

We claim:

1. Apparatus for delivering a stable frequency A.-C. voltage comprising the source of D.-C. voltage, a non-resonant vibrator connected to said D.-C. voltage source and having a vibrator coil, a movable contact and a pair of stationary contacts, a source of A.-C. voltage, a binary counter operable to supply an output voltage of half the frequency of its input voltage, trigger means connected to said source of A.-C. voltage operable to supply the input voltage to said counter, and means connecting the output voltage of said counter to said vibrator coil.

2. Apparatus of claim 1 wherein said counter is a bistable multivibrator and including means connected to said vibrator for detecting unequal dwell time of said vibrator.

3. Apparatus of claim 2, wherein said detecting means comprises a transformer having a pair of primary coils whose electrically remote ends are connected to the stationary contacts of said vibrator, a balanced relay including a pair of oppositely acting coils, the electrically adjacent ends of said primary coils being each connected to one side of one of said relay coils, and the other sides of said relay coils being connected together and through normally closed contacts of said relay to one side of said D.-C. source, the other side of said D.-C. source being connected to the movable contact of said vibrator.

4. In combination, a D.-C. to A.-C. converter which requires a cyclic controlling signal of equal dwell time on opposite sides of a datum to produce a stable frequency voltage, a source of A.-C. voltage, a binary counter operable to supply an output voltage of half the frequency of its input voltage, means for supplying said A.-C. voltage to said counter to trigger it, a source of D.-C. voltage connected to said converter, and means supplying the output of said counter to said converter to control it.

5. The apparatus of claim 4 in which said converter is a non-resonant mechanical vibrator and said counter is a bistable multivibrator.

References Cited in the file of this patent

UNITED STATES PATENTS

| | | |
|---|---|---|
| 2,234,919 | Ressler | Mar. 11, 1941 |
| 2,532,911 | Henson et al. | Dec. 5, 1950 |
| 2,536,808 | Higinbotham | Jan. 2, 1951 |
| 2,685,056 | Hester | July 27, 1954 |